United States Patent [19]

Klaue

[11] 4,096,926
[45] Jun. 27, 1978

[54] ACTUATOR AND COOLING STRUCTURE FOR DISK BRAKES

[76] Inventor: Hermann Klaue, Tour d'Ivoire 28e, 1820 Montreux, Switzerland

[21] Appl. No.: 711,276

[22] Filed: Aug. 3, 1976

Related U.S. Application Data

[63] Continuation-in-part of Ser. No. 694,399, Jun. 9, 1976, which is a continuation-in-part of Ser. No. 634,896, Nov. 24, 1975, Pat. No. 4,054,189, which is a continuation of Ser. No. 415,681, Nov. 14, 1973, abandoned, which is a continuation-in-part of Ser. No. 288,287, Sep. 12, 1972, Pat. No. 3,885,650, which is a continuation-in-part of Ser. No. 73,566, Sep. 18, 1970, abandoned.

[30] Foreign Application Priority Data

| Dec. 2, 1969 | Germany | 1960286 |
|---|---|---|
| Dec. 27, 1969 | Germany | 1965171 |
| Dec. 27, 1969 | Germany | 1965170 |
| Nov. 17, 1972 | Switzerland | 16741/72 |
| Nov. 22, 1975 | Germany | 2552451 |
| Dec. 19, 1975 | Germany | 2557331 |

[51] Int. Cl.² ............................... F16D 55/10
[52] U.S. Cl. ................... 188/71.4; 188/71.6; 188/264 AA; 188/366; 192/70; 192/85 AB; 192/113 A
[58] Field of Search .................. 188/18 A, 71.4, 71.6, 188/72.5, 264 A, 264 AA, 366; 192/70, 85 AB, 113 A; 92/75

[56] References Cited

U.S. PATENT DOCUMENTS

| 2,334,053 | 11/1943 | Whitten | 188/366 |
|---|---|---|---|
| 2,720,943 | 10/1955 | Kershner et al. | 188/71.4 |
| 3,921,767 | 11/1975 | Yokoi | 92/75 |

FOREIGN PATENT DOCUMENTS

| 1,235,498 | 5/1960 | France | 188/366 |
|---|---|---|---|
| 1,351,759 | 12/1963 | France | 188/264 AA |
| 1,179,126 | 10/1964 | Germany | 188/264 AA |
| 726,439 | 3/1955 | United Kingdom | 188/366 |

*Primary Examiner*—George E. A. Halvosa
*Attorney, Agent, or Firm*—Stevens, Davis, Miller & Mosher

[57] ABSTRACT

A fully lined disk brake adapted for use to advantage with a wheel of a light-weight passenger car has a radially outwardly open brake housing secured to a hub of the wheel by circumferentially spaced radial arms. The brake housing has a radially inward wall provided with spaced openings which communicate with openings between the radial arms which support the housing. A stepped ring responsive to fluid under pressure is disposed between the brake disks in the brake housing for actuation of the brakes. The stepped rings which form the brake actuating member are provided with axial projections having spaces therebetween which contact the brake shoes. Air for ventilating the brakes is drawn through the openings between the arms and in the inner wall of the housing and passes between the projection members on the stepped rings to ventilate the brake disk. In one embodiment of the invention stepped rings providing a Z-shaped interface with one of the rings having an annular groove therein and the other ring having a complementing annular projection disposed in the groove is also preferably provided with the axial projections between the rings and the brake disk.

8 Claims, 6 Drawing Figures

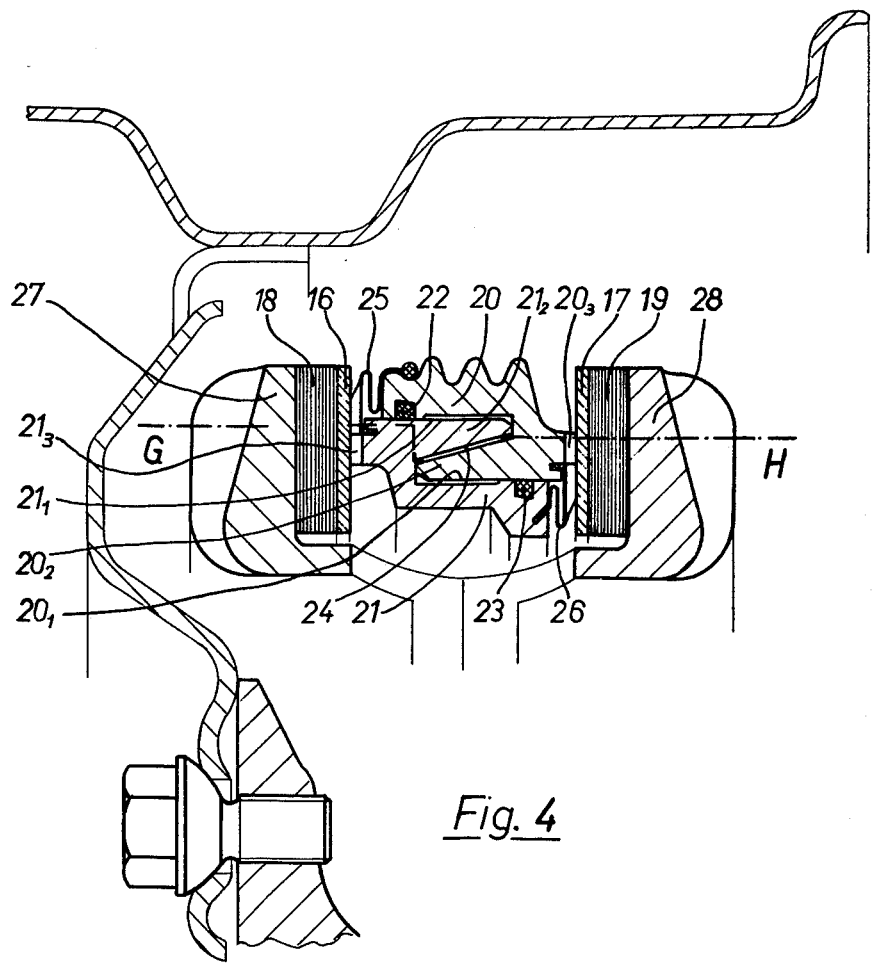
Fig. 4
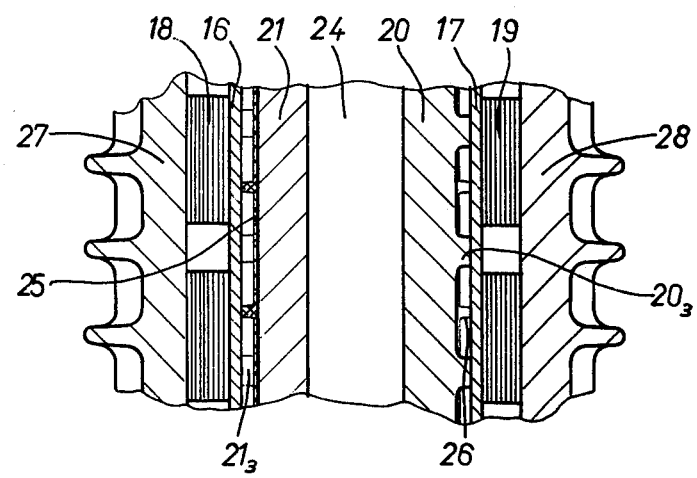
Fig. 5 (G-H)

ACTUATOR AND COOLING STRUCTURE FOR DISK BRAKES

This application is a continuation-in-part of my copending application Ser. No. 694,399 filed June 9, 1976, which in turn is a continuation-in-part of my application 634,896 filed Nov. 24, 1975, now U.S. Pat. No. 4,054,189, which is a continuation of application Ser. No. 415,681 filed on Nov. 14, 1973, now abandoned, which in turn is a continuation-in-part of application Ser. No. 288,287 filed Sept. 12, 1972, now U.S. Pat. No. 3,885,650 granted May 27, 1975, the latter application being a continuation-in-part of application Ser. No. 73,566 filed Sept. 18, 1970, now abandoned.

Fully lined disk brakes for motor vehicles are known and are disclosed, for example, in U.S. Pat. No. 3,885,650 issued May 27, 1975. In such brakes, two lined brake disks are arranged in an annular brake housing which is open on its radially outer side. The brake disks are suspended in the brake housing on a stationary brake carrier which surrounds the brake housing and fixes the brake disks from rotation with the wheel but permits movement axially to brake the wheel. A hydraulic actuating device having step rings is arranged between the disks in the annular gap of the brake housing. The housing has external ribs for heat dissipation.

An object of this invention is to provide a fully lined disk brake, particularly for passenger cars, in which the heat absorbed by the brake housing is dissipated as rapidly as possible to the air and the hydraulic actuating device arranged between the brake lining disks is thermally and mechanically relieved. In this connection, the accessibility to the brake and the possibility of easily changing the lining is retained.

Other objects will become apparent from the following description with reference to the accompanying drawing wherein FIG. 1 is a longitudinal section of one embodiment of the invention for a driven front wheel taken along the line A-B of FIG. 2;

FIG. 3A is a plan view of that portion of the embodiment of FIG. 3 marked "Z";

FIG. 4 is a partial longitudinal section of a second embodiment of the invention; and FIG. 5 is an enlarged fragmenting view taken along the line G-H of FIG. 4.

Figure 1:
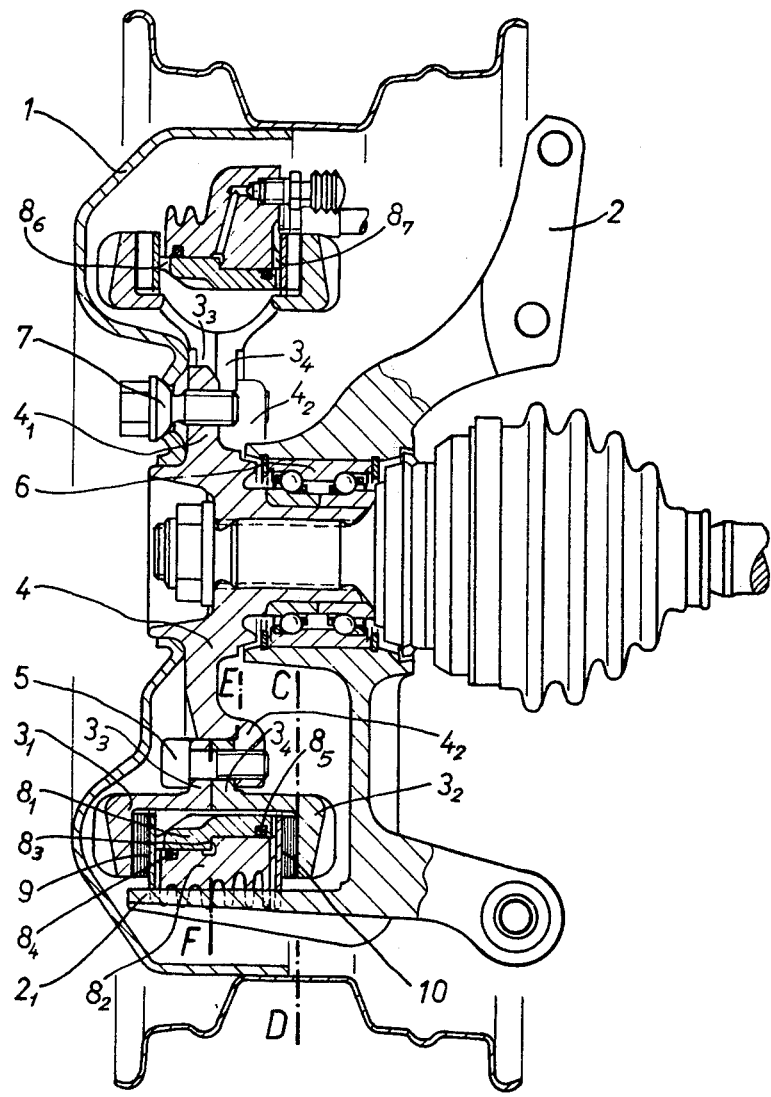

The foregoing objects and others are accomplished in accordance with this invention, generally speaking, by providing a fully lined disk brake for a wheel of a motor vehicle having (a) a brake housing having two annular parts bolted together to form a yoke shaped member which encloses a gap which is open in its radially outer side and has spaced openings in its radially inner side between wheel bolts for flow of air into the gap, (b) an annular brake housing which is yoke shaped in cross-section and has radially extending axially spaced walls and a radially inner wall with circumferentially spaced openings which combine to form a radially outward open gap for brake disks and brake disk actuating mechanism, the housing having circumferentially spaced extension arms which extend radially inwardly from the inner wall to provide for securing the housing to a hub on the wheel, and a pair of brake disks and fluid actuated stepped rings disposed in the gap for moving the brake disks against the braking surfaces of the housing. The two annular members forming the fluid actuated stepped rings each have a plurality of spaced extension or projection members which contact the brake disk. Air flows through the openings between the extension arms and openings in the inner wall of the brake housing into the gap and through openings between the projection member of the step rings to cool the brake disks and brake actuating mechanism.

In the brake of the invention, uniform flow of cooling air over the brake housing is assured. As a result of the symmetrical development of the brake housing and uniform ventilating, the thermal load is uniformly distributed over the two halves of the brake housing. Through the large openings on the inner circumference of the brake housing, the air penetrates into the inside of the brake and can be led to the outside through the spaces which are formed by the step rings of the actuation mechanism, their axial extensions or projections, and the brake lining disks, and in this way cool the hydraulic actuating device. The axial extensions of the step rings of the actuating device which transmit the pressure forces to the brake lining rings which are arranged at the places where the steps of the two step rings are located transmit the pressing forces for the braking on both sides on the same circle of action so that upon actuation no torque which subjects the hydraulic actuating unit to torsional force is produced.

As a further development of the invention, the yoke-shaped extensions of the brake-housing halves are attached to radial extensions of the hub which are set-back with respect to the wheel-side front surface of the wheel-hub flange. By this measure, the free cross section for the cooling air is still further increased.

In still another embodiment of the invention, the step of the hydraulic actuating device is developed in Z-shape, as seen in cross section, in such a manner that the width, required for the wear path, of the inner cylindrical surface of the outer step ring associated with the inner sealing ring, as well as the width, necessary for the wear path, of the outer cylindrical surface of the inner step ring associated with the outer sealing ring, lies in the new condition of the brake, within the same axial region of the ring actuation. By this measure the width of the brake and therefore its weight are reduced. This embodiment of the invention preferably has the axial projections on the stepped rings which contact the brake disks so that air cooling of the brakes is at a maximum but the Z-shaped structure can be used for actuating brake disks even if the rings do not have the projections where air cooling is not of major importance or other ventilating means is provided.

Figure 2:
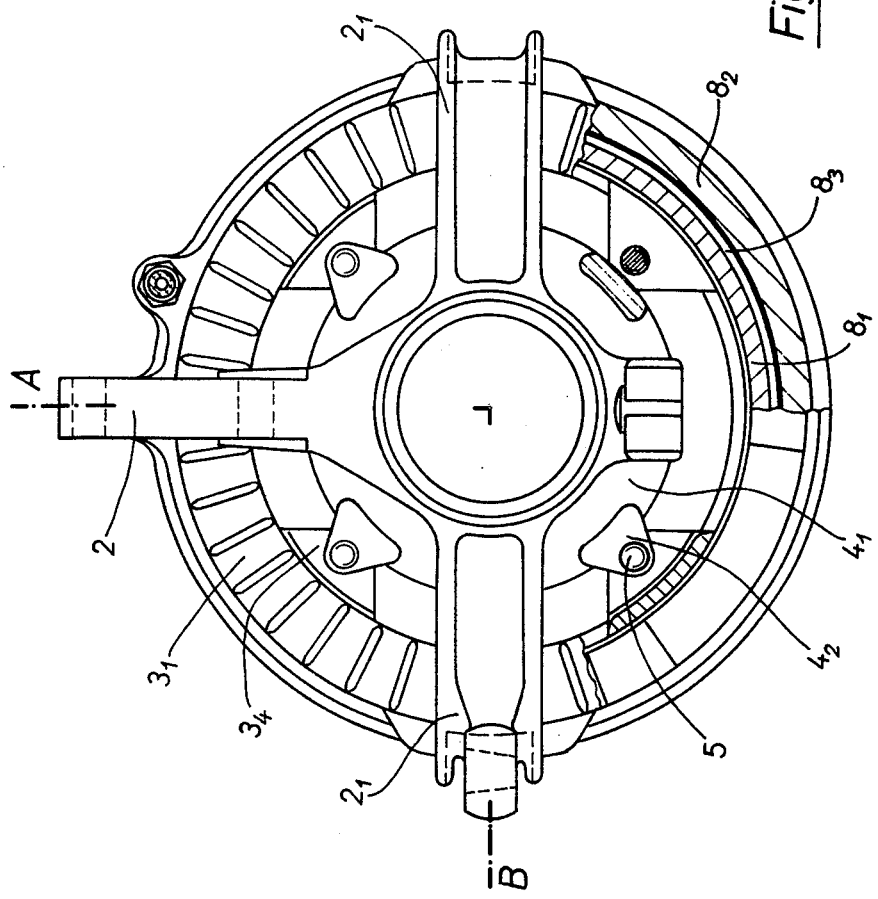
FIG. 2 is a side elevation looking from the inside of the wheel in the upper one-half and is divided into two partial cross-sections taken along the lines C-D and E-F of FIG. 1 in the lower one-half.
Figure 3:
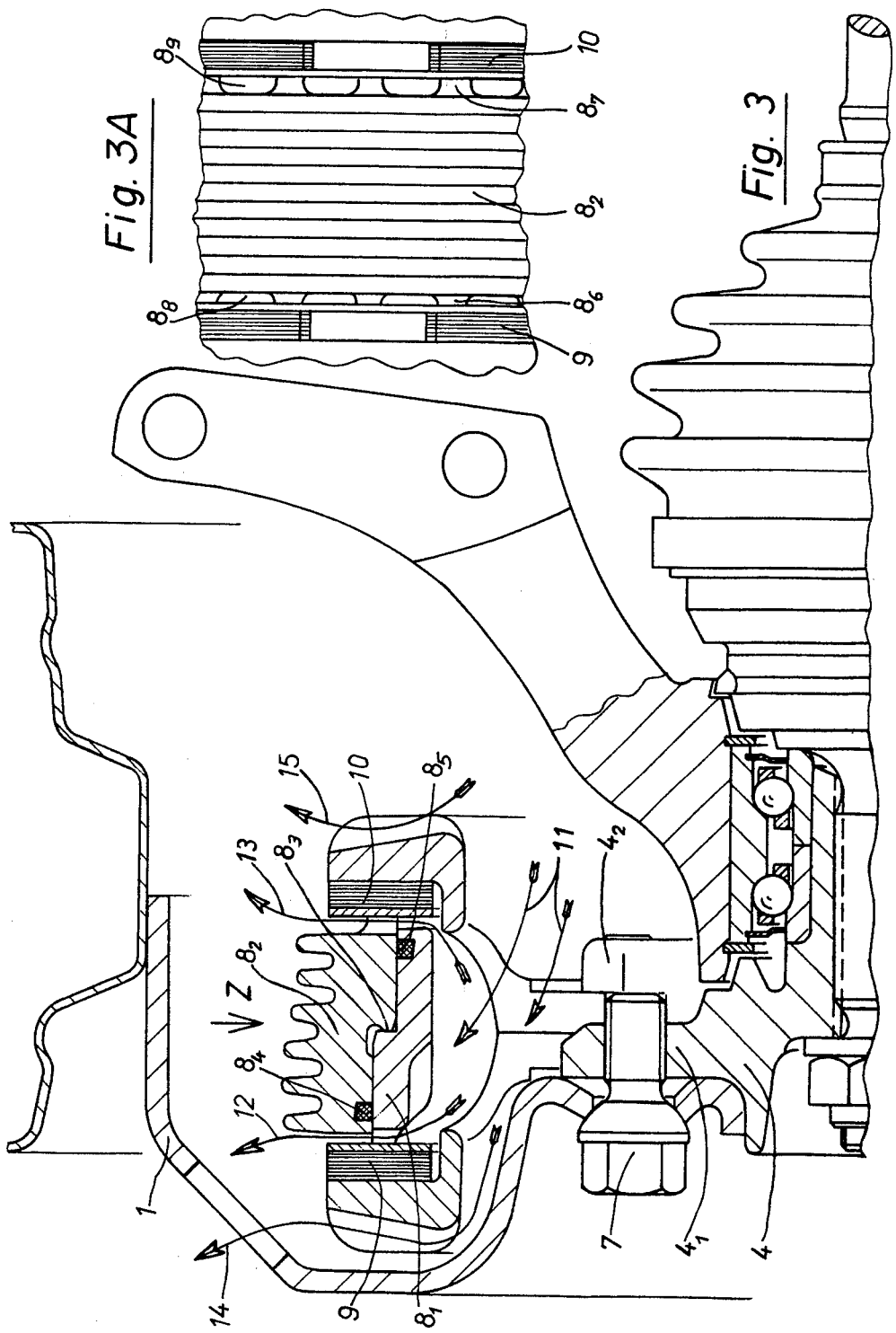
FIG. 3 is an enlarged longitudinal section through one-half of the embodiment of FIG. 1.

In FIGS. 1 through 3, a front driven wheel 1 for a light weight passenger car is shown. A wheel bracket 2 is also a brake carrier and for this purpose has two extension members $2_1$. The brake housing consists of two annular parts $3_1$ and $3_2$ and is connected to the wheel hub 4 by bolts 5. The hub 4 is supported in the wheel bracket on a double ball bearing 6. The hub 4 bears at its annular flange part 4' the wheel 1 by means of the wheel bolts 7 and the brake housing $3_1$, $3_2$ on radial extensions $4_2$.

The actuating device has a radially inner step ring $8_1$, and outer step ring $8_2$, and a step $8_3$ on which the hydraulic pressure acts. The sealing of the hydraulic actuating device at the interface between rings $8_1$ and $8_2$ is effected by two packing rings $8_4$ and $8_5$ in grooves in rings $8_1$ and $8_2$, respectively. These sealing rings, at the same time, insure infinitely variable adjustment of the brake disks in case of wear of the linings. The step rings press against the brake lining rings 9 and 10 via a plurality of spaced extensions or projection members $8_6$ and $8_7$ which are arranged on the same circle of action as the step $8_3$, the brake lining rings being suspended, fixed in circumferential direction but axially movable, on the brake carrier arms $2_1$.

Between the axial projection members $8_6$ and $8_7$ there are provided openings $8_8$ and $8_9$ through which cooling air fed to the brake when the wheel rotates can pass at the rear surfaces of the brake lining rings. For ventilation, the brake housing halves $3_1$ and $3_2$ are connected with each other only by yoke-shaped extensions $3_3$ and $3_4$; between the extensions $3_3$ and $3_4$ the brake housing is open on its inner circumference. The side walls of the yoke-shaped extensions $3_3$ and $3_4$ act as fan blades when the wheel rotates. This fan action of the brake inner parts is indicated by the arrows 11, 12, and 13 in FIG. 3. Furthermore, the cooling air flows around the radial ribs of the brake housing halves in the direction indicated by the arrows 14 and 15.

FIGS. 4 and 5 show an embodiment in which the fluid actuated mechanism has a Z-shaped step. FIG. 4 shows the upper half of a passenger car brake, seen in longitudinal section. FIG. 5 is a partial cylindrical section along the line G-H of FIG. 4 through the brake. For the sake of clarity of the drawing, the brake housing attachment, which is effected in the same manner as in the example of FIGS. 1 to 3, has been omitted in FIG. 4.

In FIGS. 4 and 5, annular members 27 and 28 form a bipartite brake housing fastened by extension members like those illustrated in FIGS. 1–3 to the hub. Two brake rings 16 and 17, provided with friction linings 18 and 19 are supported on a brake carrier arm as shown in FIGS. 1–3 which surround the brake housing. The brake shoes are freely movable axially but fixed in circumferential direction. A step ring actuation member is formed of two ring members 20 and 21 and is supported on the brake carrier.

Grooved ring 22 arranged in the outer step ring 20 and grooved ring 23 arranged in the inner step ring 21 seal the interface between the rings and provide for adjustment of the brake shoes. The grooved rings 22 and 23, upon a brake stroke by which the normal lift stroke, established by the development of the cross section of the grooved ring and which takes place by deformation, is exceeded as a result of wear, slide on the cylindrical surface $20_1$ of the outer step ring and on the cylindrical surface $21_1$ of the inner step ring. In order to assure a sufficient wear stroke, the lengths of these cylindrical surfaces, in the same way as in the example of FIGS. 1 to 3, must have a dimension at least twice the wear thickness of one brake lining.

The facing surfaces $20_1$ and $21_1$ of rings 20 and 21 are concentric with each other and lie in the same widthwise region of the brake. For this purpose the step 24 is developed in Z-shape. For the Z-shape development of the step each step ring is provided with an extension member $20_2$ or $21_2$, respectively, which are frusto-conically shaped in cross-section and mate with the extension member $21_2$ disposed on and radially outward from member $20_2$ in an annular groove in member 20.

The two step rings transmit their axial force by spaced extension members $20_3$ and $21_3$ (FIG. 5) which are arranged opposite each other and in the region of the step 24. The sealing-off from dirt is effected by two bellows 25 and 26 connecting the two step rings with each other.

Although the invention has been described in detail for the purpose of illustration, it is to be understood that such detail is solely for that purpose and that variations can be made therein by those skilled in the art without departing from the spirit and scope of the invention except as it may be limited by the claims.

I claim:

1. A fully lined disk brake adapted for motor vehicles comprising a rotating externally open, radially ribbed brake housing and a stationary brake carrier disposed over the brake housing, brake lining disks suspended on the brake carrier and fixed in the circumferential direction but freely movable axially, said brake housing being formed of two annular parts and having an inner wall member having circumferentially spaced openings, said annular parts having yoke-shaped housing extension members integral with the inner wall member between openings, means for attaching the brake housing to a flange on a wheel hub comprising bolts which connect the yoke-shaped housing extension members between bolts which attach the wheel to the flange, and a hydraulic actuating device having two step rings, axial extending spaced projection members on each step ring, lying in the region of the step between the step rings, said projections contacting said brake disks.

2. The fully lined disk brake according to claim 1, characterized by the fact that the attachment of the yoke-shaped housing extension members is effected on radial extension members on the wheel hub which are set-back with respect to the wheel-side face surface of the wheel hub flange.

3. A fully lined disk brake according to claim 1, characterized by the fact that the step between the rings of the hydraulic actuating device is Z-shaped in cross section whereby the width, necessary for the wear path, of the inner cylindrical surface of the outer step ring associated with an inner sealing ring and the width, necessary for the wear path, of the outer cylindrical surface of the inner step ring associated with an outer sealing ring lie, when the brake is new, in the same axial region of the actuating device.

4. In a brake assembly for a motor vehicle wheel comprising a brake housing comprising an annular member having an annular gap of channel-like cross-section open on its radially exterior side, the opposite inner sides of said channel-like gap providing annular braking surfaces, said brake housing being attachable to be rotatable jointly with a wheel of an assembly to be braked; brake shoes fully lining the housing disposed from the radially exterior side into the channel-like gap and having friction linings facing the braking surfaces, means for moving said brake shoes into contact with said braking surfaces and means for non-rotatably supporting each pair of brake shoes in the gap, the improvement wherein said means for moving the brake shoes comprises a pair of annular rings disposed in the gap between the brake shoes, said annular rings having facing mating surfaces with a step therebetween and forming a fluid actuatable stepped member, each annular ring having a plurality of spaced axially extending projection members which contact the adjacent brake shoe with openings therebetween, said brake housing having circumferentially spaced openings in its radially inner wall and having radially extending circumferentially spaced arms with openings therebetween which communicate with openings in said inner wall, said arms providing means for attaching the brake housing to the wheel, whereby upon rotation of the wheel air is drawn through the openings between the arms, through the openings in the inner wall and through openings between the projections to ventilate the brake shoes.

5. The brake assembly of claim 4 wherein said annular rings forming a stepped member are a first annular radially inner ring which is cross-section has a radial outer surface divided axially into two parts separated by a step therebetween and a second annular ring having a radially inner surface which compliments the radially outer surface of the first ring and is disposed thereagainst to provide an annular interface between said surfaces, means for introducing fluid into the interface at the step, and means for sealing the interface on each side of the step.

6. A brake assembly for a wheel of a motor vehicle comprising:
   a brake housing comprising an annular member having radially extending walls axially spaced to form an annular gap of channel-like cross-section open on its radially exterior side, the opposite inner sides of said walls facing said channel-like gap providing annular braking surfaces;
   brake shoes disposed in the channel-like gap having friction faces facing the adjacent braking surfaces, means for non-rotatably supporting each pair of brake shoes in the gap; and
   means for actuating the brake shoes disposed in the gap between the brake shoes comprising
   a first ring member having a radially inner surface which is substantially concentric with the axis of the brake housing and an opposite surface and, between the two surfaces, an axially extending annular groove, and
   a second ring disposed radially inwardly from the first ring and having a surface facing the said first surface of the first ring with an interface therebetween, and an annular projection member which is inserted in the groove with an interface between opposing surfaces of the projection member and the groove,
   means for introducing a fluid under pressure into the space provided by the interface, and
   means for sealing the interface on each side of the fluid introducing means;
   each of said rings forming the brake shoe actuating member having a plurality of axially extending spaced projection members which contact the brake shoe with openings therebetween for flow of air between the brake shoes and rings, said brake housing having an annular inner wall member with circumferentially spaced openings which only partially close the radially inner side of the gap, and means for fastening the brake housing to a hub on the wheel for rotation therewith comprising a plurality of circumferentially spaced radial arms integral with the said annular member, said spaces between the arms and in said annular inner wall combining to provide a path for air to be drawn into the gap as the wheel rotates.

7. A brake assembly for a wheel of a motor vehicle comprising:
   a brake housing comprising an annular member having radially extending walls axially spaced to form an annular gap of channel-like cross-section open on its radially exterior side, the opposite inner sides of said walls facing said channel-like gap providing annular braking surfaces, said brake housing having a radially inner wall with spaced openings therein for flow of air into the gap, means for attaching the brake housing to a hub of the motor vehicle,
   brake shoes disposed in the channel-like gap having friction faces facing the adjacent braking surfaces, means for non-rotatably supporting each pair of brake shoes in the gap; and
   means for actuating the brake shoes disposed in the gap between the brake shoes comprising
   a first ring member having a radially inner surface which is substantially concentric with the axis of the brake housing and an opposite surface and, between the two surfaces, an axially extending annular groove, and
   a second ring disposed radially inwardly from the first ring and having a surface facing the said first surface of the first ring with an interface therebetween, and an annular projection member which is inserted in the groove with an interface between opposing surfaces of the projection member and the groove,
   means for introducing a fluid under pressure into the space provided by the interface, and
   means for sealing the interface on each side of the fluid introducing means.

8. A fully lined disk brake adapted for motor vehicles comprising a brake housing having an annular gap which is open on its radial exterior side, a stationary brake support member disposed over the gap, brake lining disks suspended on the brake carrier in the gap and fixed in the circumferential direction but freely movable axially,
   said brake housing being formed of two annular parts and having an inner wall member having circumferentially spaced openings, said annular parts having yoke-shaped housing extension members integral with the inner wall member between openings, means for attaching the brake housing to a flange of a wheel hub comprising bolts which connect the yoke-shaped housing extension members between bolts which attach the wheel to the flange, and a hydraulic actuating device having two step rings, axial extending spaced projection members on each step ring, lying in the region of the step between the step rings, said projections contacting said brake disks.

* * * * *